United States Patent
Erdmann et al.

(10) Patent No.: US 8,079,555 B2
(45) Date of Patent: Dec. 20, 2011

(54) APPARATUS FOR SETTING THE SPACING OF A FREE STANDING RANGE FROM A FLOOR

(75) Inventors: Klaus Erdmann, Heerstedt-Lohe (DE); George May, New Bern, NC (US); Dirk Schumann, Rosenheim (DE)

(73) Assignee: BSH Home Appliances Corporation, Huntington Beach, CA (US)

( * ) Notice: Subject to any disclaimer, the term of this patent is extended or adjusted under 35 U.S.C. 154(b) by 0 days.

(21) Appl. No.: 12/895,994

(22) Filed: Oct. 1, 2010

(65) Prior Publication Data

US 2011/0017883 A1    Jan. 27, 2011

Related U.S. Application Data

(62) Division of application No. 10/988,247, filed on Nov. 12, 2004, now Pat. No. 7,866,614.

(51) Int. Cl.
*F16M 11/24* (2006.01)

(52) U.S. Cl. ............... 248/188.4; 248/188.91; 248/649

(58) Field of Classification Search ............ 248/188.2, 248/188.4, 188.8, 188.91, 605, 649, 672
See application file for complete search history.

(56) References Cited

U.S. PATENT DOCUMENTS

| | | | |
|---|---|---|---|
| 1,208,210 A | 12/1916 | Purcell et al. | |
| 3,175,795 A | 3/1965 | Adams et al. | |
| 3,868,079 A | 2/1975 | Johnson | |
| 4,068,815 A | 1/1978 | Losert | |
| 4,653,968 A | 3/1987 | Rapata et al. | |
| 5,169,033 A | 12/1992 | Shay | |
| 5,536,068 A | 7/1996 | Valentor et al. | |
| 5,697,586 A | 12/1997 | Lybarger | |
| 5,967,472 A | 10/1999 | Wilhelmstatter et al. | |
| 6,142,431 A | 11/2000 | Herzog | |
| 6,186,453 B1 | 2/2001 | Redbone | |
| 6,533,238 B2 | 3/2003 | Barnes et al. | |
| 2002/0139909 A1 | 10/2002 | Oyama et al. | |
| 2009/0278003 A1* | 11/2009 | Chiang | 248/188.4 |
| 2011/0058317 A1* | 3/2011 | Oota | 361/679.01 |
| 2011/0148259 A1* | 6/2011 | Justis | 312/228 |
| 2011/0198458 A1* | 8/2011 | Karl et al. | 248/188.4 |

FOREIGN PATENT DOCUMENTS

GB        2353078 A        2/2001

* cited by examiner

*Primary Examiner* — Terrell McKinnon
*Assistant Examiner* — Steven Marsh
(74) *Attorney, Agent, or Firm* — James E. Howard; Andre Pallapies

(57) ABSTRACT

An apparatus for setting the spacing of a free standing range relative to a floor includes a base component for contacting the floor, a threaded element, and a winding follower. The winding follower extends into the helical recess of the threaded element such that the winding follower travels progressively further along the helical recess of the threaded element. A blocking member engages the winding follower during travel of the winding follower along the helical recess of the threaded element to resist a disengagement movement.

2 Claims, 8 Drawing Sheets

APPARATUS FOR SETTING THE SPACING OF A FREE STANDING RANGE FROM A FLOOR

CROSS REFERENCE TO RELATED APPLICATIONS

This application is a Divisional, under 35 U.S.C. §121, of U.S. application Ser. No. 10/988,247, filed Nov. 12, 2004.

BACKGROUND OF THE INVENTION

1. Field of the Invention

This invention relates to an apparatus for setting the spacing of an appliance from a surface. More particularly, the invention relates to an apparatus for setting, leveling and maintaining the spacing of an appliance from a floor or other surface.

2. Discussion of the Prior Art

Free standing ranges, dishwashers, and other appliances are often equipped with floor support arrangements that can be deployed to ensure the level support of the appliance on a floor or other support surface. It is desirable to have a level support for an appliance to promote, for example, efficient operation of the appliance or to ensure the optimum orientation for opening and closing doors or access lids.

Various floor support arrangements have been proposed for setting the height of each corner of the appliance. One such conventional floor support arrangement includes a floor-contact foot secured to the lower end of a threaded rod that itself is threaded into an aperture on the appliance. The aperture may be configured as an annular cut out in a bottom structure of the appliance and the aperture edge has a diameter sized relative to the threaded rod such that the aperture edge threads onto the threaded rod in a manner similar to the threading of a nut onto a bolt. (04) U.S. Pat. No. 4,068,815 discloses a self-locking support mechanism for leveling an appliance relative to the floor. The device includes a rotatable cam member having a pivot point, a cam surface to contact the floor for height adjustment, and a radius surface relative to the pivot point. The cam member rotates by a pin through the pivot point and a slot in the support member, and the pin is slidably movable within the slot. The slot and support end wall are spaced from each other and converge toward each other in a direction away from the floor so that upon rotating the cam member, the pin is moved within the slot away from the floor and the cam member radius surface abuts the support end wall to lock the cam member in the adjusted disposition. (05) In connection with the task of setting the spacing from a floor of an appliance such as a free standing range, it would be desirable if such a floor support arrangement was stable and could resist any movement thereof acting to dismount or disengage the floor support arrangement from the appliance.

BRIEF SUMMARY OF THE INVENTION

In accordance with the present invention, there is provided an apparatus for setting the spacing of an appliance from a surface such as floor, wherein the inventive apparatus resists any movement thereof acting to dismount or disengage it from the appliance. (07) In accordance with one aspect of the present invention, there is provided an apparatus for setting the spacing of a free standing range from a floor, wherein the free standing range is of the type having an aperture for threaded mounting of the spacing apparatus. The floor spacing setting apparatus includes a threaded bolt-like body, a foot at one end of the bolt for resting on the floor, and a winding follower at the location of the aperture of the free standing range that threads onto the bolt when the bolt is rotated into the aperture of the free standing range. Also, the floor spacing setting apparatus includes a nip formed between the threads of the bolt through which the winding follower passes as the bolt is rotated into the aperture of the free standing range, whereby, once the winding follower and the bolt have been threaded together, the bolt can then only be unthreaded from the free standing range by guiding the winding follower through the nip. (08) In accordance with a further aspect of the present invention, there is provided an apparatus for setting the spacing of an appliance from a stand off surface that includes a base component for contacting the stand off surface, a first threaded element, a winding follower, and a blocking member. The first threaded element has an axis, a radially projecting winding having an overall helical shape, and a helical recess formed by the radially projecting winding. The first threaded element is connectable to a selected one of the appliance and the base component and the winding follower being connectable to the other of the appliance and the base component. The winding follower extends into the helical recess of the first threaded element such that the winding follower travels progressively further along the helical recess of the first threaded element during an engagement movement in which the winding follower and the first threaded element are rotated relative to one another. The winding follower retreats progressively along the helical recess of the first threaded element during a disengagement movement in which the winding follower and the first threaded element are rotated relative to one another in a direction opposite to their relative rotation during an engagement movement. The blocking member engages the winding follower during travel of the winding follower along the helical recess of the first threaded element to resist at least one of an engagement movement and a disengagement movement.

In accordance with additional details of the further aspect of the present invention, the blocking member includes a transverse surface extending transverse to the travel path of the winding follower along the helical recess of the first threaded element, the transverse surface of the blocking member for engaging the winding follower to resist retreating travel of the winding follower along the helical recess of the first threaded element. Also, the blocking member includes a ramp surface that, as viewed in the travel direction of the winding follower during an engagement movement, progressively reduces the extent of the helical recess of the first threaded element perpendicular to its helical direction and the transverse surface of the blocking member is disposed downstream of the ramp surface in the travel direction of the winding follower during an engagement movement, whereby, during an engagement movement, the winding follower travels successively past the ramp surface and then past the transverse surface and, thereafter, during a disengagement movement effecting retreating travel of the travel follower, the winding follower is engaged by the transverse surface to resist retreating travel of the winding follower along the helical recess of the first threaded element.

In accordance with a preferred feature of the further aspect of the present invention, the blocking member includes a pair of ramp surfaces disposed oppositely to one another at a location along the helical recess of the first threaded element. Each ramp surface extends, as viewed in the travel direction of the winding follower during an engagement movement, increasingly toward the other opposed ramp surface such that the extent of the helical recess of the first threaded element transverse to its helical direction between the opposed ramp surfaces is progressively reduced and the transverse surface of the blocking member is disposed downstream of the opposed ramp surfaces as viewed in the travel direction of the winding follower during an engagement movement, whereby, during an engagement movement, the winding follower travels successively past the ramp surface and then past the transverse surface and, thereafter, during a disengagement movement effecting retreating travel of the travel follower, the winding follower is engaged by the transverse surface to resist retreating travel of the winding follower along the helical recess of the first threaded element.

BRIEF DESCRIPTION OF THE SEVERAL VIEWS OF THE DRAWING

Having briefly described the present invention, the same will become better understood from the following detailed description, made with reference to the appended figures of the drawings, wherein.

DETAILED DESCRIPTION OF THE INVENTION

Figure 1:
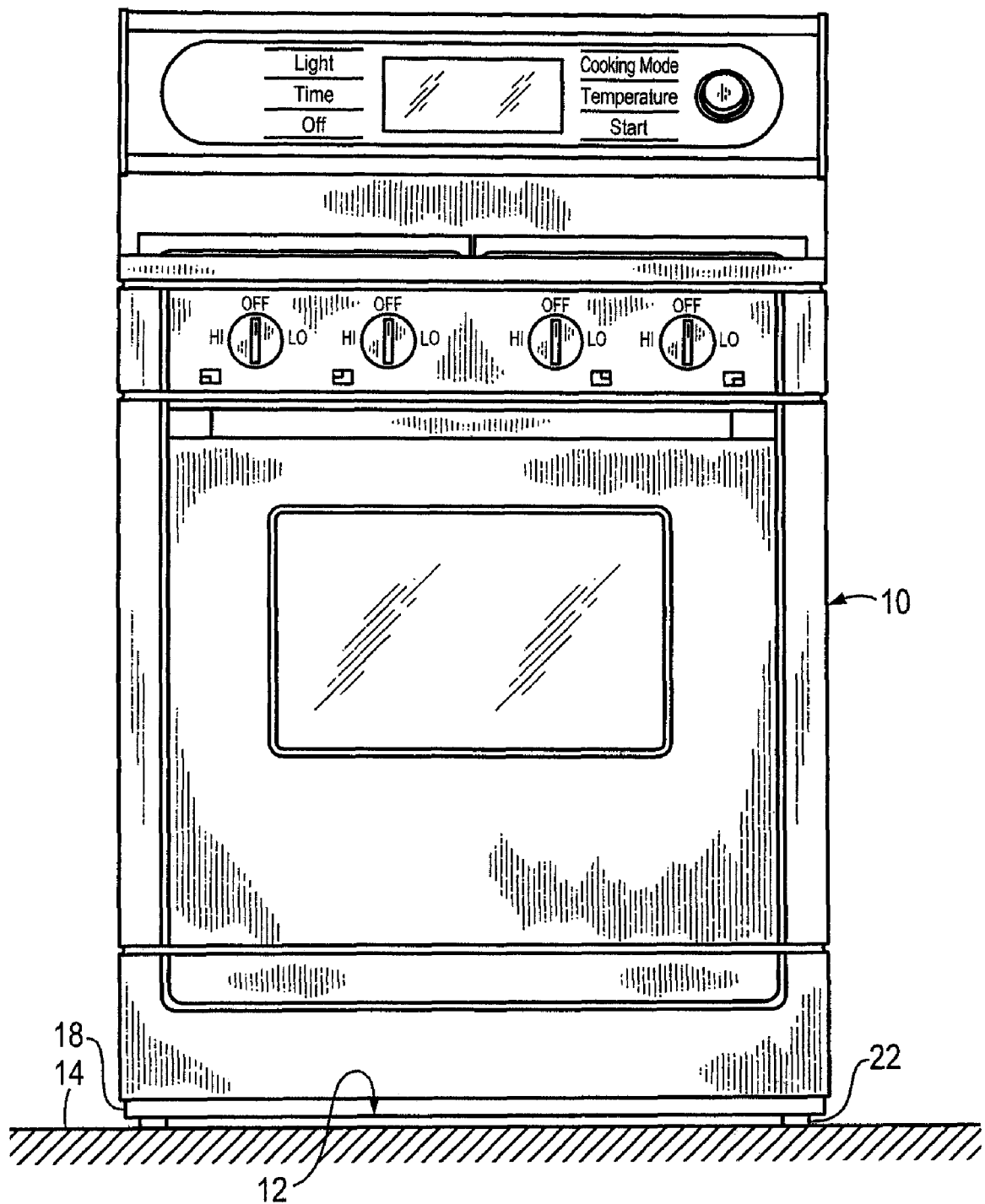
FIG. 1 is a front plan view of a free standing range having a first embodiment of the stand off adjustment apparatus of the present invention.
Figure 2:
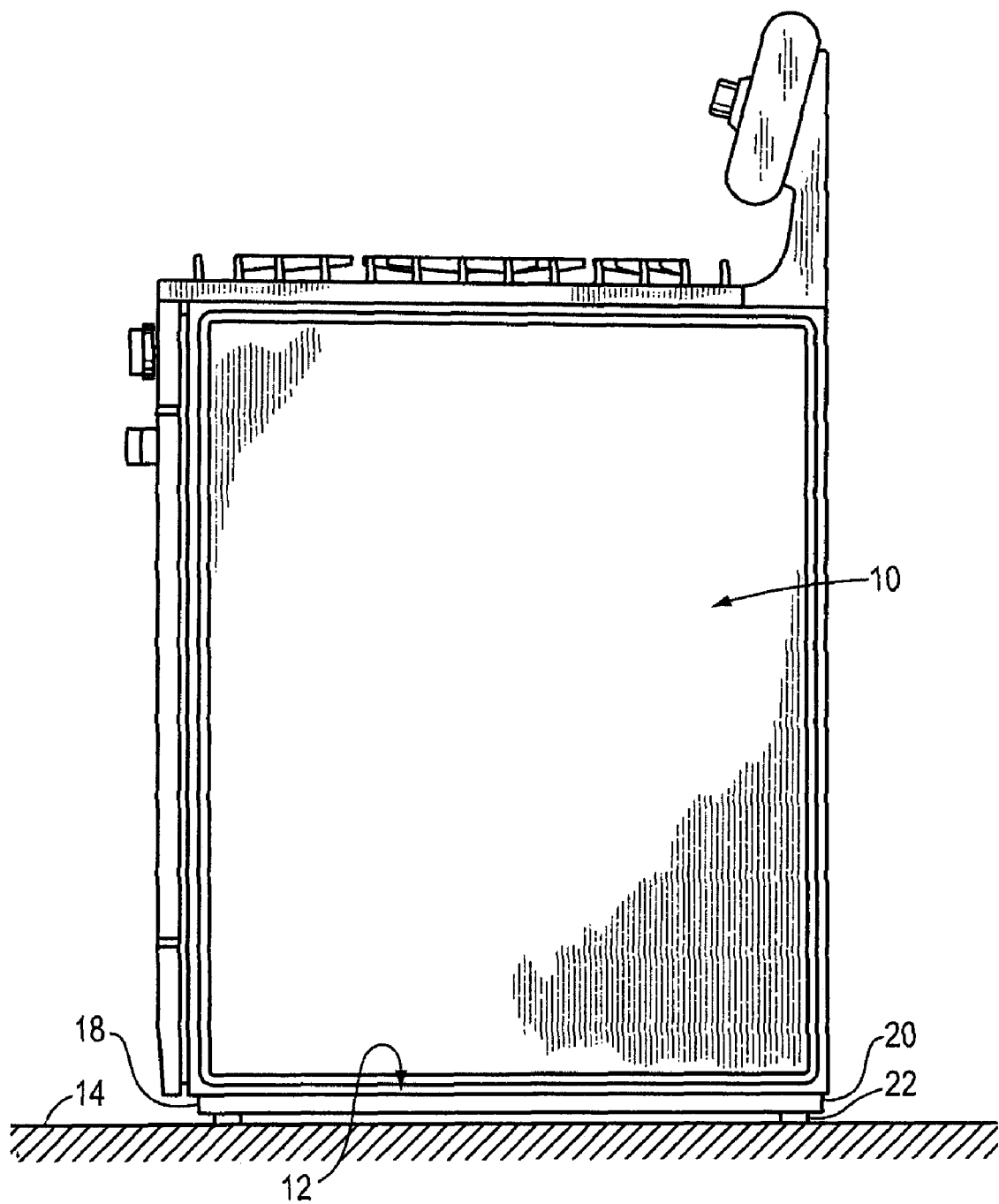
FIG. 2 is a side elevational view of the free standing range of FIG. 1 and showing the support of the free standing range by the embodiment of the stand off adjustment apparatus of the present invention on a floor.

As seen in FIG. 1, which is a front and a partial perspective view of a free standing range 10 including one embodiment of the stand off adjustment apparatus of the present invention. The free standing range 10 is illustrated with a front control panel 11, a top control panel 13 and a door panel 15, all in a front plan view and a cooking surface 17 in a perspective view for ease of illustration. The free standing range 10 includes a bottom tray 12 and the free standing range 10 is to be supported on a respective surface—namely, a floor 14—such that the bottom tray 12 is at a predetermined stand off spacing or distance from the floor 14. The bottom tray 12 of the free standing range 10 has a generally four-cornered shape defined by a front pair of corners 18, as seen in FIG. 1, and a rear pair of corners 20, only one of which is shown in FIG. 2, which is a side elevational view of the free standing range 10. Each corner of the pair of front corners 18 and the pair of the rear corners 20 of the bottom tray 12 is supported at a spacing from the floor 14 by a respective stand off adjustment apparatus of the present invention—namely, a first embodiment of the stand off adjustment apparatus of the present invention, hereinafter designated as the stand off adjustment apparatus 22.

Figure 3:
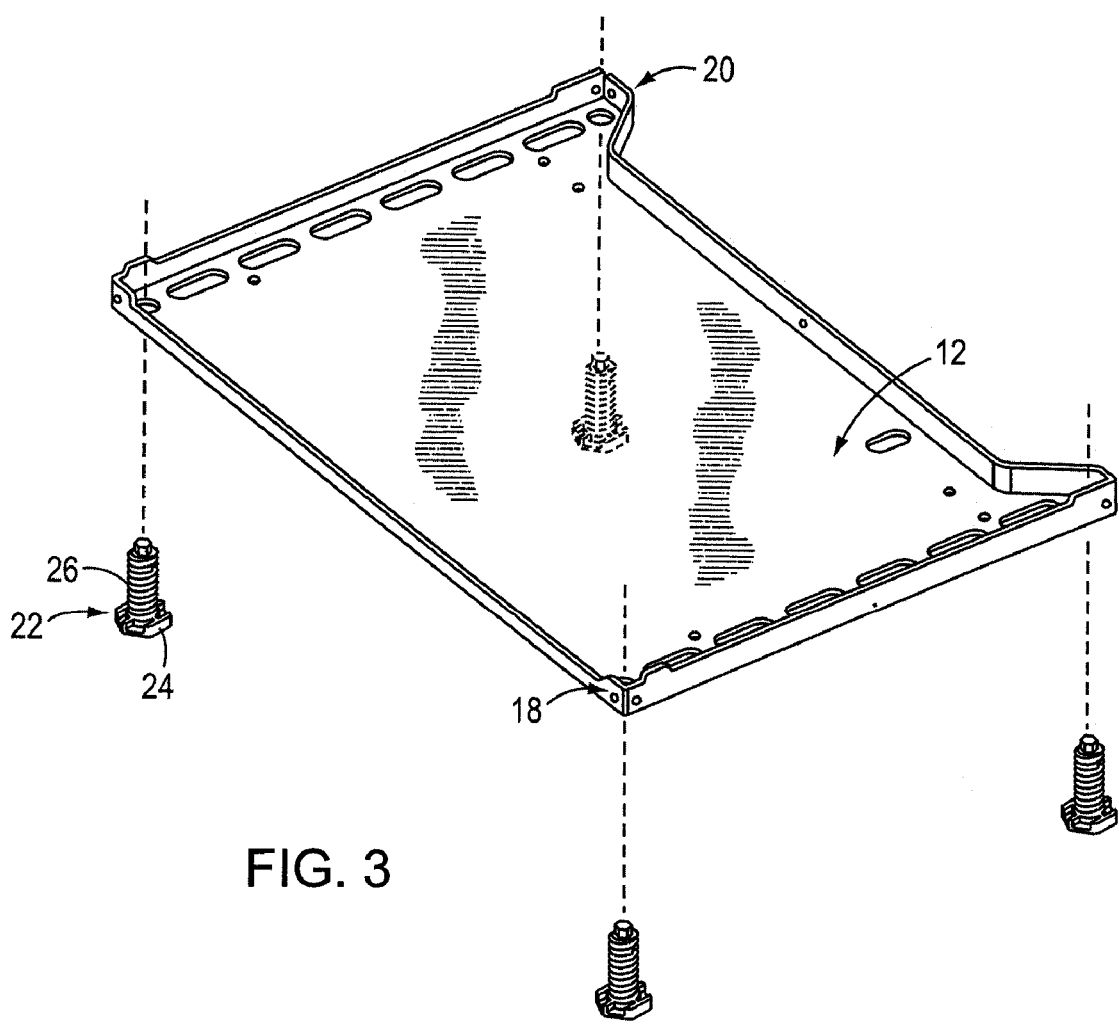
FIG. 3 is an exploded perspective view of the bottom tray of the free standing range of FIG. 1 and showing four units of one preferred embodiment of the stand off adjustment apparatus of the present invention each secured to a respective corner location of the bottom tray.

Reference is had to FIG. 3, which is an exploded perspective view of the bottom tray 12 of the free standing range 10 showing each stand off adjustment apparatus 22 in its operative position at a respective corner of the bottom tray 12. A total of four (4) units of the stand off adjustment apparatus 22 preferably form the respective stand off adjustment apparatus group for the free standing range 10, although it is to be understood that a greater or lesser number of units of the stand off adjustment apparatus of the present invention can be provided as desired for supporting the respective free standing range or other appliance. For example, one corner could be a fixed support or post with the other three corners including the adjustment apparatus 22.

As will be described in more detail hereinafter, each stand off adjustment apparatus 22 is configured in coordination with the other stand off adjustment apparatus 22 in the group such that the free standing range 10 is collectively supported by the stand off adjustment apparatus group in a level (non-tilting) orientation at a predetermined stand off spacing above the floor 14. Moreover, the stand off adjustment apparatus 22 of the present invention advantageously minimizes the risk that one or more of the stand off adjustment apparatus 22 in the respective stand off adjustment apparatus group supporting the free standing range 10 or other appliance may inadvertently become disattached from the free standing range 10 or other appliance. Furthermore, the stand off adjustment apparatus 22 of the present invention advantageously provides an indication to the appliance consumer or installer that the stand off adjustment apparatus 22 has been properly installed.

Figure 4:
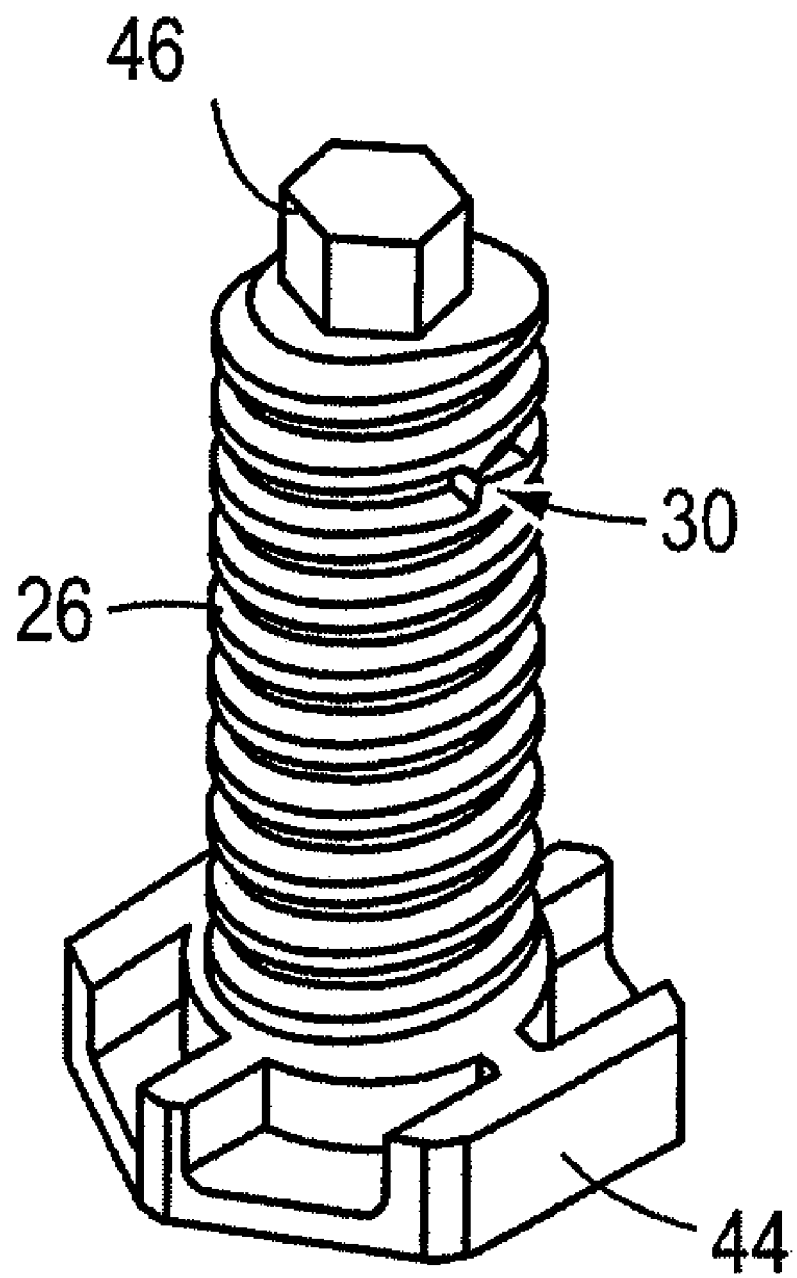
FIG. 4 is an enlarged perspective view of the first threaded element of the embodiment of the stand off adjustment apparatus of the present invention shown in FIGS. 1-3.
Figure 5:
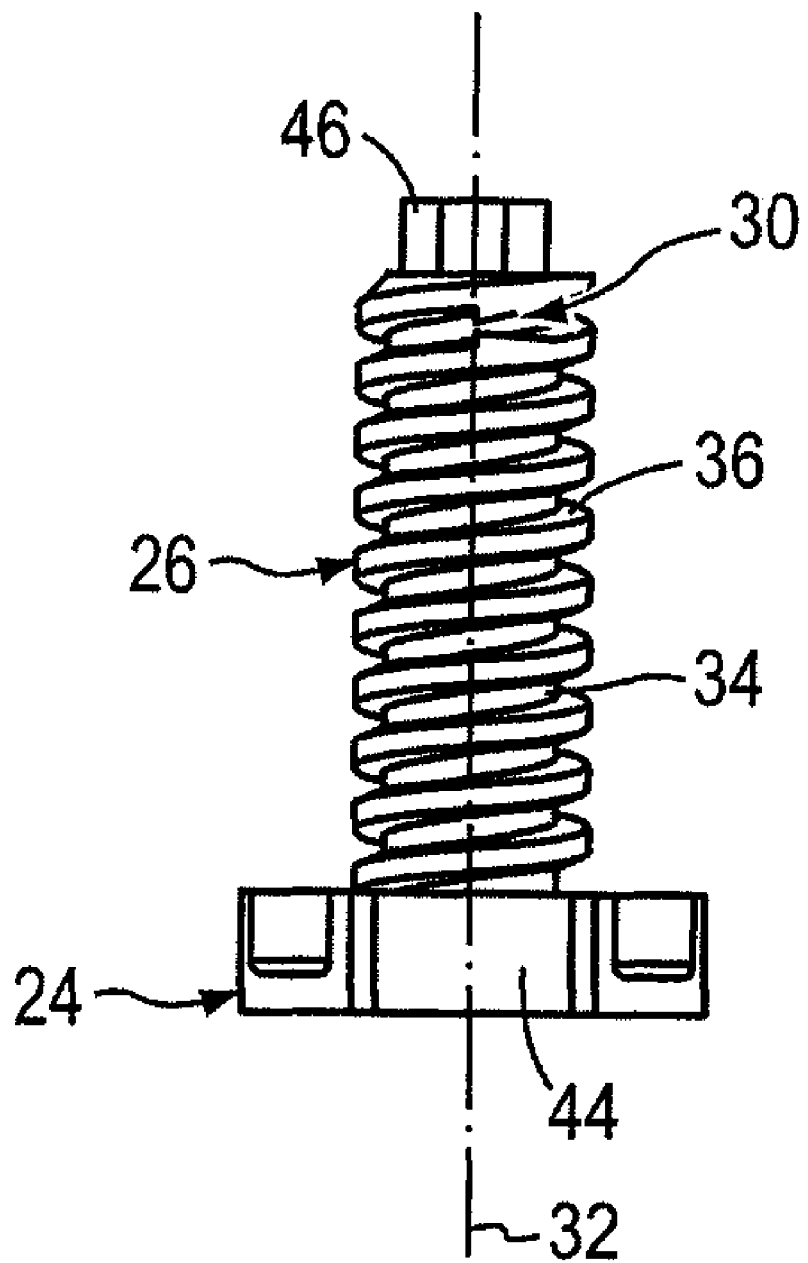
FIG. 5 is a front plan view of the first threaded element of the embodiment of the stand off adjustment apparatus of the present invention shown in FIGS. 1-4.
Figure 6:
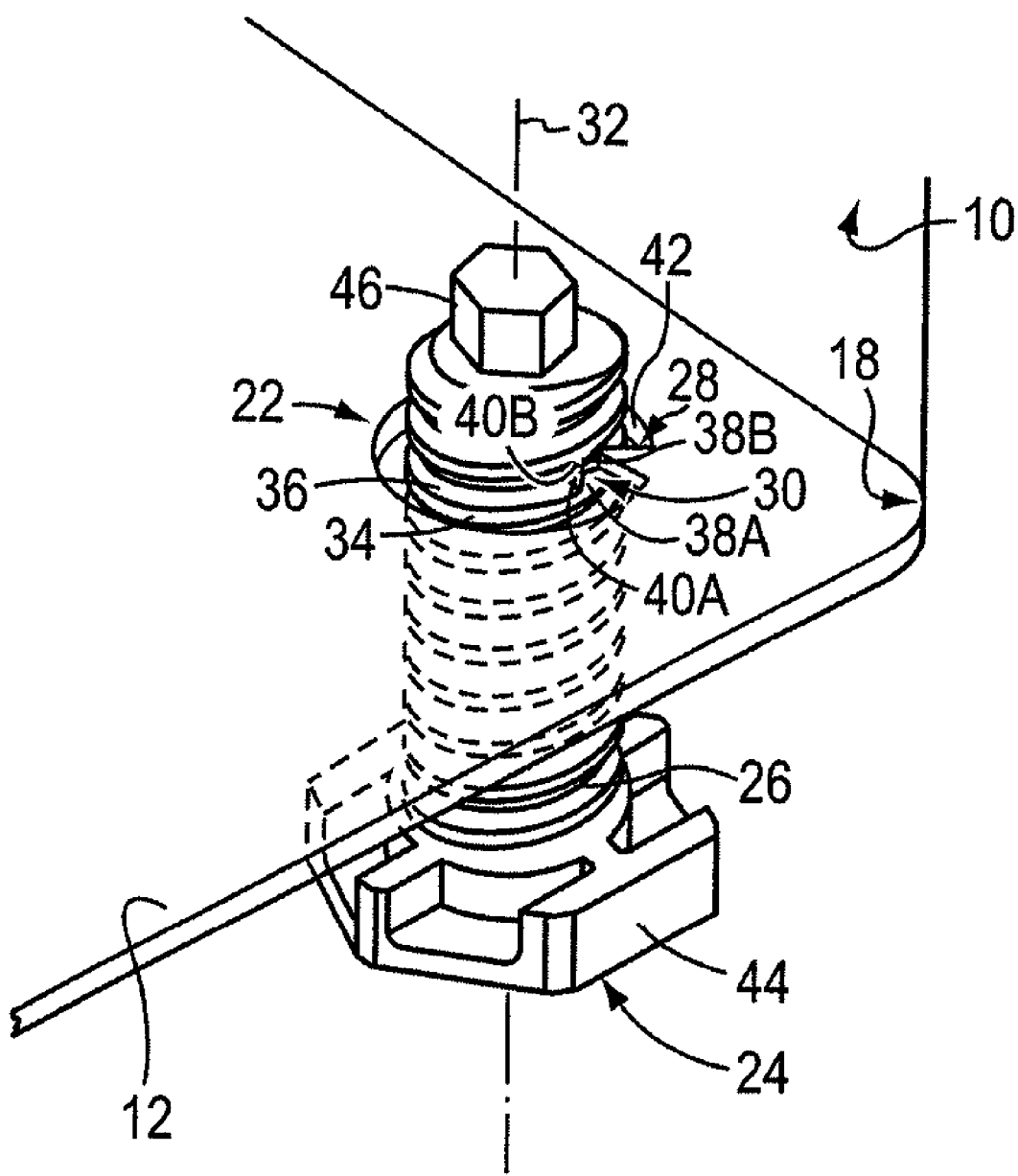
FIG. 6 is an enlarged perspective view of the threaded engagement of the first threaded element and the winding follower of the embodiment of the stand off adjustment apparatus of the present invention shown in FIGS. 1-5 and showing the travel of the winding follower between the pair of oppositely disposed ramp surfaces of the first threaded element.

As seen generally in FIGS. 3-5, and as seen in more detail in FIG. 6, which is an enlarged perspective view of a portion of the stand off adjustment apparatus 22, each stand off adjustment apparatus 22 includes a base component 24, a first threaded element 26, a winding follower 28 (FIG. 6), and a blocking member 30. The base component 24 is operable to contact the stand off surface—i.e., the floor 14. The first threaded element 26 is connectable to a selected one of the appliance (i.e., the free standing range 10) and the base component 24 and the winding follower 28 is connectable to the other of the appliance and the base component 24 and, with more particular regard to the embodiment of the stand off adjustment apparatus of the present invention, the first threaded element 26 preferably is connected with the base component 24 by being integrally formed with the base component 24 and the winding follower 28 preferably is connected to the bottom tray 12 of the free standing range 10 by being integrally formed with the bottom tray 12.

The first threaded element 26 (FIGS. 5 and 6) has an axis 32, a radially projecting winding 34 having an overall helical shape, and a helical recess 36 formed by the radially projecting winding 34. The winding 34 has a nominal surface that defines the overall helical shape of the winding in that the nominal surface, with the exception of a pair of projections as will be described later, winds in a continuous axial spiral from a top termination point to a bottom termination point adjacent the respective end of the first threaded element 26 at which the base component 24 is connected.

The winding follower 28 (FIG. 6) is configured to extend into the helical recess 36 of the first threaded element 26 such that the winding follower 28 travels progressively further along the helical recess 36 of the first threaded element 26 during an engagement movement in which the winding follower 28 and the first threaded element 26 are rotated relative to one another. Conversely, during a disengagement movement wherein the first threaded element 26 is rotated in a direction opposite to its rotation during an engagement movement, the winding follower 28 executes a retreating movement progressively along the helical recess 36 of the first threaded element 26.

Thus, to dispose each stand off adjustment apparatus 22 in its operative position on a respective corner of the free standing range, the first threaded element 26 of the stand off adjustment apparatus 22 is rotated in an engagement movement relative to a respective associated one of the pair of front corners 18 and the pair of the rear corners 20 of the bottom tray 12 such that the winding follower 28 at the respective associated corner is engaged by the first threaded element 26 and thereafter travels progressively further along the helical recess 36 of the first threaded element 26. The spacing between the base component 24, which contacts the floor 14, and the bottom tray 12 of the free standing range progressively decreases in correspondence with the travel of the winding follower 28 progressively further along the helical recess 36 of the first threaded element 26. The stand off spacing of the free standing range 10 from the floor 14 can consequently be set at a desired spacing by controlling the extent of travel of winding follower 28 along the helical recess 36 of the first threaded element 26 and, as is described hereinafter, the stand off adjustment apparatus 22 advantageously resists any disengagement movement of the stand off adjustment apparatus 22 once the desired extent of travel of the winding follower 28 along the helical recess 36 of the first threaded element 26 has been reached.

FIG. 6 illustrates the positions of the respective winding follower 28 of one corner of the pair of front corners 18 and the respective first threaded element 26 during an engagement movement in which the winding follower 28 is traveling along the helical recess 36 of the first threaded element 26. During an engagement movement, as the winding follower 28 approaches the end of its predetermined extent of travel along the helical recess 36 of the first threaded element 26, the winding follower 28 moves into contact with the blocking member 30 and subsequently, in traveling further along the helical recess 36 of the first threaded element 26, the winding follower 28 travels out of contact with the blocking member 30. The blocking member 30 is operable to engage the winding follower 28 during travel of the winding follower 28 along the helical recess 36 of the first threaded element 26 to resist at least one of an engagement movement and a disengagement movement and, with more particular regard to the embodiment of the stand off adjustment apparatus of the present invention shown in FIGS. 1-7, the blocking member 30 is operable to engage the winding follower 28 during a disengagement movement of the winding follower 28 along the helical recess 36 of the first threaded element 26 to resist such disengagement movement.

The rotation of the first threaded element 26 relative to the associated corner 18 of the bottom tray 12 is ceased once the appliance 10 is at a desired height. The same engagement movement is then repeated for the remaining three of the four (4) units of the stand off adjustment apparatus 22 that form the respective stand off adjustment apparatus group for the free standing range 10, whereupon the free standing range 10 is then leveled and disposed on the floor 14 with the base components 24 of the four (4) units of the stand off adjustment apparatus 22 each resting on the floor 14. The free standing range 10 then has a level cooking surface 17.

Any rotation of the first threaded element 26 relative to its associated corner of the bottom tray 12 in a direction opposite to its rotation during an engagement movement will act as a disengagement movement causing the winding follower 28 to retreat progressively along the helical recess 36 of the first threaded element 26. In accordance with the present invention, once the winding follower 28 has traveled out of contact with the blocking member 30 to conclude an engagement movement, the stand off adjustment apparatus 22 advantageously resists disengagement movement of the stand off adjustment apparatus 22 that would effect retreating travel of the winding follower 28 past the blocking member 30.

The blocking member 30 is operable to engage the winding follower 28 during its travel along the helical recess 36 of the first threaded element 26 to resist at least one of an engagement movement and a disengagement movement and, more specifically in connection with the embodiment of the stand off adjustment apparatus of the present invention shown in FIGS. 1-7, the blocking member 30 is operable to engage the winding follower 28 during retreating travel of the winding follower 28 along the helical recess 36 of the first threaded element 26 to resist the disengagement movement. The blocking member 30, in the embodiment of the stand off adjustment apparatus of the present invention, is configured on the first threaded element 26 and the blocking member 30 includes a transverse surface extending transverse to the travel path of the winding follower 28 along the helical recess 36 of the first threaded element 26. The transverse surface of the blocking member 30 engages the winding follower 28 to resist retreating travel of the winding follower 28 along the helical recess 36 of the first threaded element 26 and, in the embodiment of the stand off adjustment apparatus of the present invention shown in FIGS. 1-5, the blocking member 30 includes a pair of oppositely disposed ramp surfaces 38A, 38B and a pair of abutment surfaces 40A, 40B each associated with the ramp surface 38A, 38B, respectively, whereupon the pair of abutment surfaces 40A, 40B form the transverse surface of the blocking member 30 that engages the winding follower 28 to resist retreating travel of the winding follower 28.

The ramp surface 38A and its associated abutment surface 40A are formed on a projection of the helical winding 34 of the first threaded element 26 that projects from the nominal surface of the helical winding 34 in the axial direction away from the respective end of the first threaded element 26 to which the base component 24 is connected. The ramp surface 38B and its associated abutment surface 40B are formed on a projection of the helical winding 34 of the first threaded element 26 that projects in the axial direction toward the respective end of the first threaded element 26 at which the base component 24 is mounted. Each of the ramp surfaces 38A, 38B increases at a constant slope from its base to its peak as viewed in the advancing direction of the winding follower 28 along the helical recess 36 of the first threaded element 26. Each abutment surface 40A, 40b is in the form of a planar surface extending parallel to the axis 32 of the first threaded element 26 and extending from the peak of the respective ramp surface 38A, 38B with which the abutment surface is associated to the nominal surface of the helical winding 34 of the first threaded element 26.

The ramp surfaces 38A, 38B guide therebetween the winding follower 28 such that the winding follower 28 passes through the nip thus formed between the ramp surfaces 38A, 38B. The ramp surfaces 38A, 38B are preferably axially spaced from one another at a predetermined nip spacing, measured at their opposed peaks, slightly less than the axially dimension of the winding follower 28 such that the ramp surfaces 38A, 38B are slightly oppositely axially deflected as the winding follower 28 passes through the nip defined by the opposed peaks of the ramp surfaces 38A, 38B. The configuration of the ramp surfaces 38A, 38B in this manner will provide a tactile indication to the appliance consumer or installer that the winding follower 28 has reached the end of its predetermined extent of travel along the helical recess 36 of the first threaded element 26 for the reason that the appliance consumer or installer will experience a temporary increase in the resistance to rotation of the first threaded element 26 as the winding follower 28 passes through the nip defined by the opposed peaks of the ramp surfaces 38A, 38B.

The winding follower 28 is preferably integrally formed with the bottom tray 12, whereupon, for example, with respect to the embodiment of the stand off adjustment apparatus of the present invention shown in FIGS. 1-7, the bottom tray 12 is formed of a metal sheet and the winding follower 28 is formed from the metal sheet as a generally triangular projection that projects radially inwardly into a bore 44 in the bottom tray 12 that has a diameter slightly larger than the diameter of the first threaded element 26. With further reference to FIG. 6, this figure of the drawings shows the threaded engagement of the first threaded element 26 and the winding follower 28 of the embodiment of the stand off adjustment apparatus of the present invention and, more particularly, this figure of the drawings shows the travel of the winding follower 28 along the helical recess 34 of the first threaded element 26 at a time when the winding follower 28 is traveling between the pair of oppositely disposed ramp surfaces 38A, 38B of the blocking member 30. The rotation of the first threaded element 26 relative to the associated corner of the bottom tray 12 may be effected manually or, alternatively, may be effected with the assistance of a tool such as, for example, a socket wrench, whereupon, in such event, the base component 24 can be configured with a nut-like formation 45 including a plurality of planar surfaces 44 that collectively form a conventional gripping surface for a socket of a predetermined geometry. The axial end of the first threaded element 26 opposite to the end integrally formed with the base component 24 can be provided with a plurality of planar surfaces 46 that collectively form a conventional gripping surface for a socket of a predetermined geometry and these planar surfaces 46 can be provided in lieu of the planar surfaces 44 of the base component 24 or in addition thereto.

Figure 7:
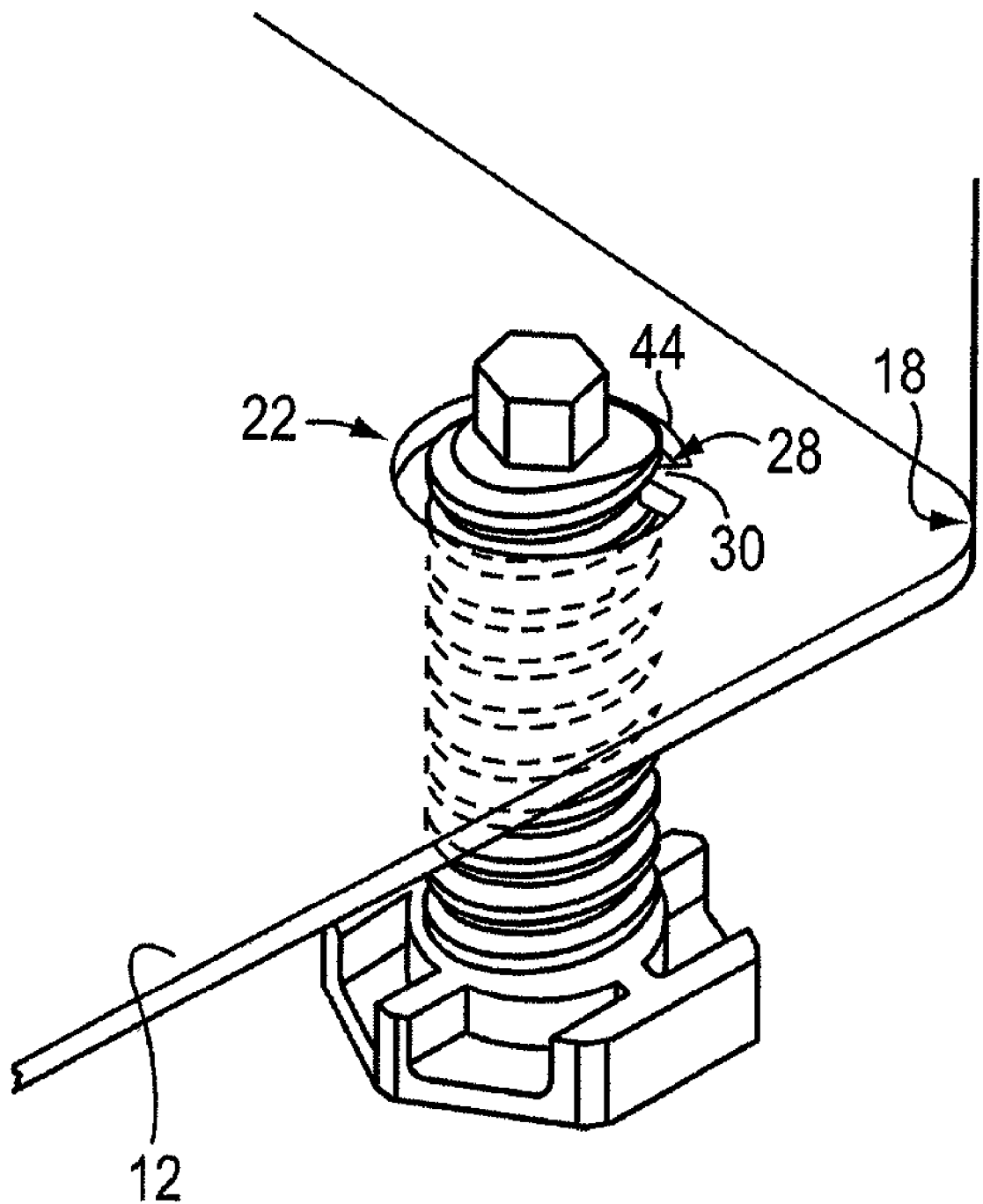
FIG. 7 is an enlarged perspective view of the threaded engagement of the first threaded element and the winding follower of the embodiment of the stand off adjustment apparatus of the present invention shown in FIGS. 1-5 and showing the winding follower after it has traveled beyond the abutment surfaces of the first threaded element.

Reference is now had to FIG. 7, which is an enlarged perspective view of the threaded engagement of the first threaded element 26 and the winding follower 28 of the embodiment of the stand off adjustment apparatus 22 of the present invention shown in FIGS. 1-5 and showing the winding follower 28 after it has traveled beyond the abutment surfaces 40A, 40B of the blocking member 30 as an engagement movement is concluded. It can be appreciated that the pair of abutment surfaces 40A, 40B will engage the winding follower 28 to resist retreating travel of the winding follower 28.

The pair of oppositely disposed ramp surfaces 38A, 38B and the pair of abutment surfaces 40A, 40B of the blocking member 30 are preferably provided on the respective extent of the helical winding 34 of the first threaded engagement element 26 between the top termination point of the helical winding 34 and the location on the helical winding 34 at which the helical winding has wound one complete revolution around the first threaded engagement element 26—in other words, the respective extent of the helical winding 34 that forms the so-called "first winding" of the helical winding. However, in accordance with the individual configuration of the free standing range 10 or other appliance with which the inventive stand off adjustment apparatus is deployed, the pair of oppositely disposed ramp surfaces 38A, 38B and the pair of abutment surfaces 40A, 40B of the blocking member 30 can be located at another suitable winding location of the helical winding 34.

The first threaded element 26 is preferably made of plastic, more preferably, glass filled nylon, of a structural strength sufficient to resist unacceptable deflection under load during the threaded interengagement of the first threaded element 26 and the winding follower 28. In this connection, the configuration of the stand off adjustment apparatus 22 should take into account the load that will be imposed by the free standing range 10 or other appliance. For example, an appliance may have an overall weight such that each of the respective four stand off adjustment apparatus 22 provided to support the appliance on the floor 14 is individually subjected to a load of two hundred pounds (200 lbs). Furthermore, it may be desirable that each stand off adjustment apparatus 22 is configured to reliably support a predetermined maximum load value that is the sum or total of (a) the actual load that will be imposed on the stand off adjustment apparatus 22 and (b) a safety margin. The safety margin can be selected, for example, as a percentage of the actual load that will be imposed on the stand off adjustment apparatus 22. Thus, in the event that the free standing range 10 has an overall weight such that each of the respective four stand off adjustment apparatus 22 is individually subjected to a load of two hundred pounds (200 lbs), and, further, if it is determined that a safety margin corresponding to ten percent (10%) of the actual load of two hundred pounds (200 lbs) is to be applied, then each stand off adjustment apparatus 22 should be configured to reliably support a predetermined maximum load value of two hundred and twenty pounds (220 lbs), as this predetermined maximum load value of two hundred and twenty pounds (220 lbs) is the sum or total of (a) the actual load two hundred pounds (200 lbs) that will be imposed on the stand off adjustment apparatus 22 and (b) the safety margin corresponding to ten percent (10%) of the actual load of two hundred pounds (200 lbs).

Figure 8:
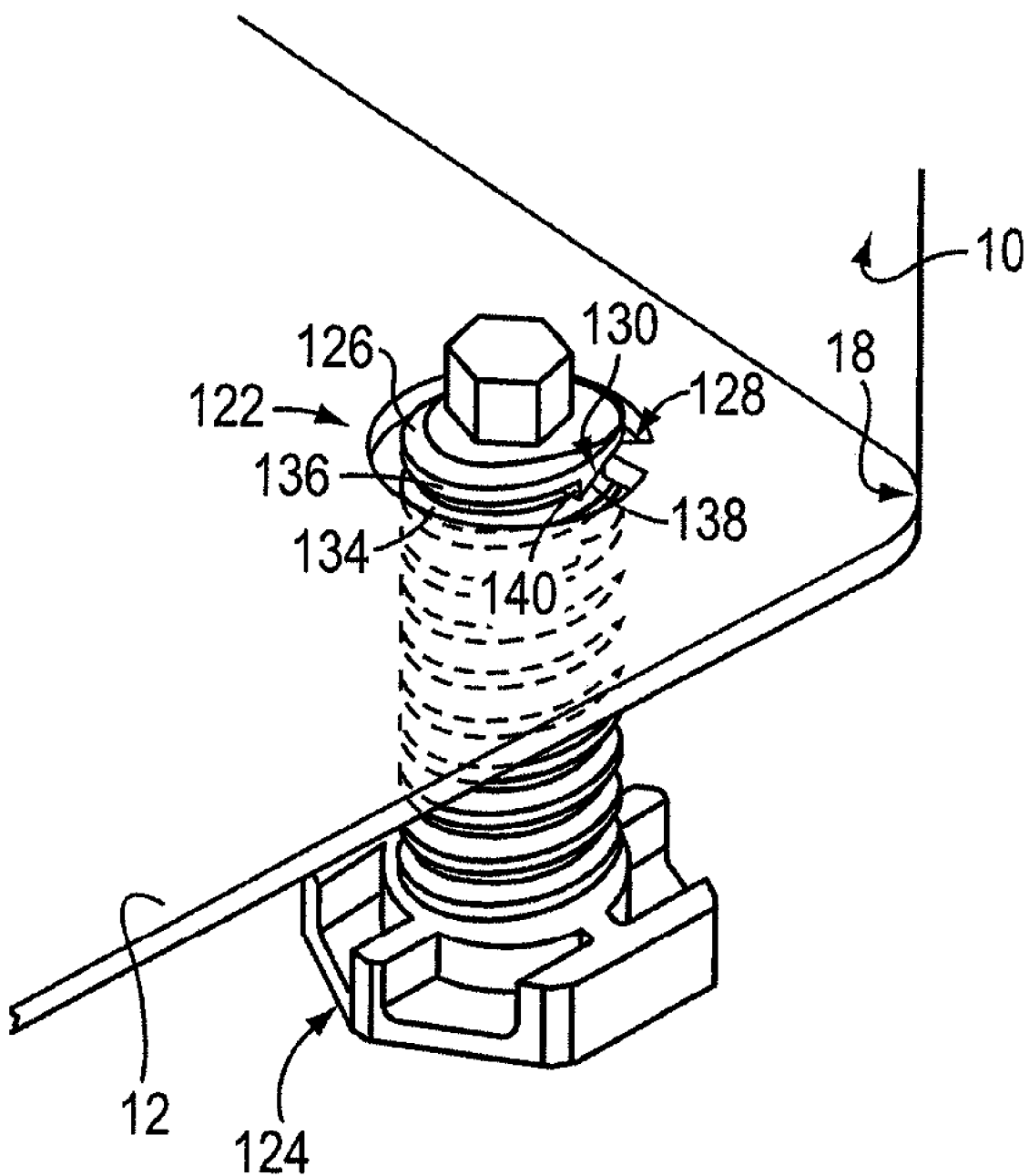
FIG. 8 is an enlarged perspective view of the threaded engagement of the first threaded element and the winding follower of another embodiment of the stand off adjustment apparatus of the present invention and showing the travel of the winding follower between the single ramp surface of the first threaded element.

Reference is now had to FIG. 8 for a description of another embodiment of the stand off adjustment apparatus of the present invention, hereinafter designated as the stand off adjustment apparatus 122. FIG. 8 is an enlarged perspective view of the bottom tray 12 of the free standing range 10 showing one unit of the stand off adjustment apparatus 122 in its operative position at a respective corner 18 of the bottom tray 12, there being a total of four (4) units of the stand off adjustment apparatus 122 that form the respective stand off adjustment apparatus group for the free standing range 10. The stand off adjustment apparatus 122 includes a base component 124, a first threaded element 126, a winding follower 128, and a blocking member 130. The blocking member 130 is configured on the first threaded element 126 and includes a transverse surface extending transverse to the travel path of the winding follower 128 along a helical recess 136 of the first threaded element 126. The transverse surface of the blocking member 130 engages the winding follower 128 to resist retreating travel of the winding follower 128 along the helical recess 136 of the first threaded element 126 and, in the embodiment of the stand off adjustment apparatus 122 shown in FIG. 8, the blocking member 130 includes a ramp surface 138 and its associated abutment surface 140 formed on a projection of the helical winding 134 of the first threaded element 126 that projects from the nominal surface of the helical winding 134 in the axial direction toward the respective end of the first threaded element 126 to which the base component 124 is connected. The abutment surface 140 forms the transverse surface of the blocking member 130 that engages the winding follower 128 to resist retreating travel of the winding follower 128.

Having thus generally described the invention, the same will become better understood from the appended claims from which it is set forth in a non-limiting manner.

What is claimed is:

1. An apparatus for setting the spacing of a free standing range from a floor, the free standing range having an aperture for threaded mounting of the apparatus, the floor spacing setting apparatus comprising:
    a bolt having threads with the threads delimiting a helical path;
    a foot at one end of the bolt for resting on the floor;
    a winding follower that threads onto the bolt when the bolt is rotated into the aperture of the free standing range; and
    only a single nip formed on the bolt, the single nip being formed between the threads of the bolt at a single location of the helical path through which the winding follower passes as the bolt is rotated into the aperture of the free standing range, whereby, once the winding follower and the bolt have been threaded together, the bolt can then only be unthreaded from the free standing range by guiding the winding follower through the nip wherein the winding follower is a second threaded element having a radially projecting winding having an overall helical shape and a helical recess formed by the radially projecting winding that are configured complementarily with the radially projecting winding and helical recess of the first threaded element such that the radially projecting winding of each of the first and second threaded elements extends into the helical recess of the other of the first and second threaded elements for threaded engagement of the first threaded element and the second threaded element with one another.

2. An apparatus for setting the spacing of an appliance from a stand off surface, the apparatus comprising:
    a base component for contacting the stand off surface;
    a first threaded element having an axis, a radially projecting winding having an overall helical shape, and a helical recess formed by the radially projecting winding;
    a winding follower, the first threaded element being connectable to a selected one of the appliance and the base component and the winding follower being connectable to the other of the appliance and the base component and the winding follower extending into the helical recess of the first threaded element such that the winding follower travels progressively further along the helical recess of the first threaded element during an engagement movement in which the winding follower and the first threaded element are rotated relative to one another and retreats progressively along the helical recess of the first threaded element during a disengagement movement in which the winding follower and the first threaded element are rotated relative to one another in a direction opposite to their relative rotation during an engagement movement; and
    a blocking member for engaging the winding follower during travel of the winding follower along the helical recess of the first threaded element to resist at least one of an engagement movement and a disengagement movement with the blocking member and the winding follower cooperating with one another to resist an engagement movement in a different manner than the blocking member and the winding follower cooperate with one another to resist a disengagement movement wherein the blocking member includes a transverse surface extending transverse to the travel path of the winding follower along the helical recess of the first threaded element, the transverse surface of the blocking member for engaging the winding follower to resist retreating travel of the winding follower along the helical recess of the first threaded element wherein the blocking member includes a pair of ramp surfaces disposed oppositely to one another at a location along the helical recess of the first threaded element, each ramp surface extending, as viewed in the travel direction of the winding follower during an engagement movement, increasingly toward the other opposed ramp surface such that the extent of the helical recess of the first threaded element transverse to its helical direction between the opposed ramp surfaces is progressively reduced and the transverse surface of the blocking member is disposed downstream of the opposed ramp surfaces as viewed in the travel direction of the winding follower during an engagement movement, whereby, during an engagement movement, the winding follower travels successively past the ramp surface and then past the transverse surface and, thereafter, during a disengagement movement effecting retreating travel of the travel follower, the winding follower is engaged by the transverse surface to resist retreating travel of the winding follower along the helical recess of the first threaded element wherein the transverse surface of the blocking member is formed by a pair of abutment surfaces, each abutment surface forming a reverse inclination slope with respect to a respective one of the pair of ramp surfaces.

* * * * *